United States Patent [19]

Ogawa et al.

[11] Patent Number: 5,938,169
[45] Date of Patent: Aug. 17, 1999

[54] ENGINE MOUNTING FOR ENGINE ACCESSORY

[75] Inventors: Akiteru Ogawa; Masako Ishikawa, both of Shizuoka-ken, Japan

[73] Assignee: Suzuki Motor Corporation, Japan

[21] Appl. No.: 08/937,316

[22] Filed: Sep. 22, 1997

[30] Foreign Application Priority Data

Nov. 26, 1996 [JP] Japan ..................................... 8-330477
Nov. 26, 1996 [JP] Japan ..................................... 8-330478

[51] Int. Cl.⁶ ....................................................... F16M 1/00
[52] U.S. Cl. ...................... 248/674; 474/113; 123/41.47; 123/195 A
[58] Field of Search .................................... 248/674, 651, 248/637, 675, 646, 222.51, 223.31, 225.11, 220.21, 220.22, 113; 123/195 A, 41.44, 41.42; 474/100, 101, 111, 112, 114, 113, 110, 120, 133, 135; 16/223, 273, 128, 378, 387

[56] References Cited

U.S. PATENT DOCUMENTS

| | | | |
|---|---|---|---|
| 1,847,720 | 3/1932 | Marcellis | 474/133 |
| 2,504,635 | 4/1950 | Bradley | 16/223 |
| 2,970,587 | 2/1961 | Estes | 123/195 E |
| 3,104,555 | 9/1963 | Shell | 474/109 |
| 3,306,121 | 2/1967 | Jenkins | 474/117 |
| 3,362,243 | 1/1968 | Ferguson | 474/113 |
| 3,430,507 | 3/1969 | Hurst et al. | 474/113 |
| 3,730,147 | 5/1973 | Buchwald | 123/41.44 |
| 3,922,927 | 12/1975 | Shiki et al. | 74/242.13 R |
| 4,023,428 | 5/1977 | Dysard | 74/242.13 R |
| 4,175,315 | 11/1979 | Hayes, Sr. et al. | 29/453 |
| 4,329,758 | 5/1982 | Fohl | 16/273 |
| 4,342,290 | 8/1982 | Drakulic | 123/41.47 |
| 4,512,752 | 4/1985 | Brenneman | 474/114 |
| 4,571,221 | 2/1986 | Isobe et al. | 474/101 |
| 4,583,961 | 4/1986 | Kawasawa et al. | 474/113 |
| 4,618,336 | 10/1986 | Isobe et al. | 474/133 |
| 4,633,828 | 1/1987 | Steele | 123/195 A |
| 4,713,861 | 12/1987 | Bancroft | 16/222 |
| 4,754,523 | 7/1988 | Chein | 16/223 |
| 4,887,992 | 12/1989 | Dixon | 474/101 |
| 5,065,713 | 11/1991 | Seats | 123/195 A |
| 5,235,724 | 8/1993 | Perrin et al. | 16/97 |

*Primary Examiner*—Leslie A. Braun
*Assistant Examiner*—Tan Le
*Attorney, Agent, or Firm*—Morrison Law Firm

[57] ABSTRACT

An accessory such as an alternator is mounted to an automobile with a mounting that includes an upper mounting bracket and a lower mounting bracket, these brackets each being connected to the accessory and to the engine. One end of the upper mounting bracket is fixed to a side of the alternator. A length of the upper bracket is provided with an elongated slot and a fastener passing through the slot is fixed to an upper part of the engine such as at a water pump casing, the upper bracket thus being slidable on the fastener to adjust a positioning of the alternator relative to the engine and correspondingly altering a tension in an engine driven accessory drive belt. Because the upper bracket is thus at the accessory inner side, overall engine width is reduced and belt tensioning achieved in more efficient way. The lower mounting bracket is made from a flat stock plate which at one side is rolled into a cylinder and to which the accessory can be connected so that when installed, the accessory can be pivoted relative to the engine from the cylinder, an opposite flat side of the plate being fixed to the engine. A bend is formed intermediate the cylinder and opposite flat side to provide that the cylinder is offset away from the engine with the lower bracket mounted thereto. By this, the lower bracket is more simply and economically produced and it can be made smaller than heretofore.

2 Claims, 15 Drawing Sheets

ENGINE MOUNTING FOR ENGINE ACCESSORY

BACKGROUND OF THE INVENTION

The present invention relates to an engine mounting for an engine accessory and, more particularly, to an engine accessory mounting which simplifies accessory installation and maintenance, reduces engine installation overall width and reduces wear and tear to the accessory when adjusting a drive belt tension effect thereon and which as well, minimizes possibility of damaging engine structure to which the mounting is made.

Automobiles and like vehicles operate from the rotary power output of an engine. Certain accessories, e.g., an alternator, utilize a part of engine rotary output by converting it into electric power which in turn is distributed to vehicle ignition and other vehicle electric power demands such as lighting, radio, electric operated windows etc. The alternator commonly is driven with an engine pulley operated drive belt, the alternator being attached or mounted to the engine cylinder block with a lower mounting bracket. Generally, an upper bracket also will be provided to connect the alternator with the engine such as to allow pivoting of the alternator about its lower bracket toward and away from the engine pulley to vary drive belt tension to a desired value.

In a known automobile engine, a cam shaft which operates the engine valves is linked to the crank shaft by a timing belt. Further and as shown in FIG. 6, a water pump 2 is provided on cylinder block 1. An accessory, alternator 3 by way of example, is located at a side of the engine. Pulleys 4 are attached to the rotary axes of each, and the pulleys are all linked by a driving belt 5.

Referring to FIG. 6, accessory 3 is supported by respective lower and upper brackets 7, 6. An elongated slotted hole 6a is formed in upper bracket 6 which extends from cylinder block 1. Accessory 3 is securely tightened to upper bracket 6 by a fastener (not shown) which passes through hole 8a in an upper flange 8 on accessory 3, the upper bracket 6 being fixed to the cylinder block 1, by a bolt 9b passing through a water pump housing extension and into an opening 6b at an end of the upper bracket.

Lower bracket 7 which is attached to cylinder block 1 has holes 7a in spaced flanges of the bracket so the accessory can be mounted to it with a bolt 9c passing through such flanges and a pair of flanges on the accessory such as is evident from FIG. 9. As a result, accessory 3 can freely move in a circular motion with bolt 9c as a pivoting center so that a position of accessory 3 relative to the engine can be adjusted. The adjustment of the tension in driving belt 5 is effected setting the tightened position of accessory 3 closer or farther from cylinder block 1. Published Japanese utility model number 60-187337 discloses that the tightening bolt can be moved using a tool to press on the flange of the accessory using the bracket as the support point.

Referring to FIGS. 7–9, it is seen that bearing case 10 of water pump 2 is attached to cylinder block 1 by a plurality of bolts (not shown). A hole 10a in a pump housing extension is used in the attachment of the upper bracket 6 to the engine this being in the housing extension as mentioned above.

Upper bracket 6 is an arc-shaped plate made, e.g., of aluminum alloy or cast iron. Slot 6a is formed along the arc. A stiffening flange 6c is formed on the upper edge of bracket 6 to strengthen it. The upper flange 8 of accessory 3 is anchored by tightening bolt 9a in slot 6a. The slot 6a it is noted is concentric with the pivot axis defined by bolt 9c with which the accessory is attached to lower bracket 7.

With this layout, upper flange surface 8 of accessory 3 and attachment surface 1a on the front side of cylinder block 1 do not become one surface. In the case where the difference in surface height is not equal that of upper bracket 6, an attachment surface 10b (which projects from the rim of cylinder block) is formed on bearing case 10 of water pump 2. Bearing case 10 serves as a spacer as well.

Referring to FIG. 12, when bearing case 10 is not used, attachment surface 1a projects from cylinder block 1. Upper bracket 6 on accessory 3 is formed as a curved surface with surface height differences and is attached to cylinder block 1.

When accessory 3 is attached to the engine, the upper bracket 6 is secured to the upper part of accessory 3. Depending on the tension in driving belt 5, there is a force pushing accessory 3 in the direction of the arrow A in FIG. 6. The force tries to push down accessory 3 and upper bracket 6 towards the front of the engine body.

Referring again to FIGS. 7–9, because upper bracket 6 is securely tightened to bearing case 10 of water pump 2, the tension in the belt has an effect on bearing case 10. There is a danger of a lowering of the surface pressure at the contact surface of bearing case 10 with part of the water pump 2 housing. In this case, influenced by leaning of accessory 3 and upper bracket 6, misalignment of driving belt 5 can increase and water leaks at the pump created.

As can be noted with reference to FIGS. 10–12, upper bracket 6 can be bent along the direction of arrow A in FIG. 6 and weakened greatly. By using a stronger material for the upper bracket, its deformation and the movement of accessory 3 can be prevented. But such would increase parts costs. Also, when belt misalignment increases, belt vibrations and noise become worse and this is undesirable.

From FIG. 7 it is noted that upper bracket 6 projects from accessory 3 by an adjustment length a, and the width of the engine becomes larger. This has a disadvantage as the position adjustment of accessory 3 goes against the tension, and the tightening of bolts is a complex procedure. During the procedure, since the accessory is supported by available tools, care must be taken not to damage the surrounding parts in case the tool slips.

Another shortcoming of prior accessory mountings for mounting the accessory to the automobile engine is the unnecessary complex construction, cost and utilization of the lower mounting bracket with which the accessory is pivoted mounted to the cylinder block or other suitable engine structure, such mounting requirement already having been mentioned above but more elaborate discussion of that shortcoming now being made.

With reference to FIGS. 19 and 20 which detail another prior engine accessory mounting, upper bracket 102 and lower bracket 103 are mounted to the side of engine 101. Lower bracket 103 provides an axis about which accessory 104 can move in a circular motion along the slotted hole 102a of upper bracket 102, upper bracket 102 being arc shaped. Upper bracket 102 is tightened to engine 101 with a bolt passing through opening 102b at an end of the bracket. On lower bracket 103, bolts 107, 109 pass through lower flanges 106, 108 of accessory 104 so that accessory 104 can move freely in a circular pivoting motion relative to the engine. Bolt 111 passes through an upper flange 110 of accessory 104 and slotted hole 102a. By changing the position where bolt 111 is tightened, accessory 104 can be moved, and the tension in the accessory driving belt adjusted, the driving belt receiving drive from pulley 112 on the engine.

Referring to FIG. 21, accessory 104 carries upper flange 110 and a pair of lower flanges 106, 108. A female screw hole 110a is formed on upper flange 110, and a bolt attachment holes 113 are formed on the lower flanges 106, 108 of the accessory.

Lower bracket 103 commonly is made of cast aluminum alloy or cast iron. A pair of upright flanges 103b, 103b are formed on a lower bracket web part 103a. Web part 103a contacts against engine 101. An end edge of web part 103a is bent to form an in turned part 103c which abuts against a front part of engine 101. Strengthening ribs 103d are formed on web part 103a orthogonal to flanges 103b, 103b. Attachment holes 113 are formed on web part 103a and in turned part 103c.

Female screw threads 103e are formed in the pair of upright parts 103b, 103b. Accessory 104 is attached to lower bracket 103 with the pair of lower flanges 106, 108 sandwiched between the flanges 103b, 103b of the lower bracket, the bolts 107, 109 passing through the flanges 106, 108 and into flanges 103b. In another case, the accessory 104 can be securely tightened to a case of a cam driving device. The accessory pulley can be supported by an L-shaped bracket which tightens from the side and front along the case and cylinder head (refer to Japanese utility model number 64-15728).

Where lower bracket 103 is cast from a light alloy, the size must be made bigger at times to provide proper strength. Further, production requirements may mandate areas needing thickness increase. As a result, the size and weight of the bracket becomes unnecessarily large. Another disadvantage is the number of bolts needed for attachment to engine 101. Accessory 104 and lower bracket 103 are secured the screws entering female threads 103e, 103e on lower bracket 103 and with two bolts 107, 109. If the configuration is made so that it is tightened together by passing through a single bolt, ribs 103d must be added as reinforcement and lower bracket 103 becomes larger.

When size and weight become large, the vibrations of accessory 104 and engine 101 become compounded, and much rigidity is required in order to withstand the vibrations. In addition, secure tightening is needed from the other side by bolts 114. But, to tighten lower bracket 103 with bolts 114 from the other direction complicates the assembly process. Attaching accessory 104 to lower bracket 103 by tightening two bolts 107, 109 from two direction also lowers the productivity of the assembly procedure.

In addition to complicating mounting of the accessory as when making a replacement, the many parts used in the mounting add to the cost of the mounting.

It is desirable therefore, that there be provided an engine mounting for an automobile engine accessory with upper and lower brackets which simplifies installation and replacement of the accessory as well as the tension adjustment of any drive belt with which the accessory is driven from the engine.

OBJECTS AND SUMMARY OF THE INVENTION

Accordingly, it is an object of the invention to provide an accessory mounting for mounting an accessory to an automobile engine which overcomes the drawbacks of the prior art.

It is a further object of the invention to provide an engine accessory mounting which makes it easier to install and maintain the accessory.

A further object is provide an engine accessory mounting which simplifies making adjustment of accessory dive belt tension.

Another object is to provide an engine accessory mounting that lessens wear and tear on mounting components and engine parts to which it is connected.

Another object is to simplify the making of the mounting parts and reduce their cost.

A still further object is to provide an engine accessory mounting which reduces overall engine width in a vehicle engine space.

In accordance with the invention, the engine mounting includes an upper bracket having an end opening and an elongated slot, the slot in the mounting of the accessory locating proximal the side of the engine when the accessory is attached thereto the engine.

In accordance the invention, a second or lower bracket of the mounting and on which the accessory can pivot is formed by forming on one side of a plate, a cylindrical area which is placed between a pair of flanges which are on the accessory and which intersect the circular motion axis of the accessory. The other side of the plate is a flat surface with attachment holes formed on the engine side. The length of the flat surface is made longer than the length of the cylindrical area and the flat surface is bent so that the cylindrical area is separated from the flat surface. Strengthening beads or ribs are formed on the bent area.

Briefly stated, there is provided a accessory such as an alternator is mounted to an automobile with a mounting that includes an upper mounting bracket and a lower mounting bracket, these brackets each being connected to the accessory and to the engine. One end of the upper mounting bracket is fixed to a side of the alternator. A length of the upper bracket is provided with an elongated slot and a fastener passing through the slot is fixed to an upper part of the engine such as at a water pump casing. The upper bracket thus can be slid on the fastener to adjust a positioning of the alternator relative to the engine and correspondingly, alter a tension in an engine driven accessory drive belt. This arrangement places the upper bracket at the accessory inner side so that overall engine width in the vehicle engine space is reduced. Further it allows belt tensioning to be effected in more efficient and convenient manner. The lower mounting bracket is made from a flat stock plate which at one side is rolled into a cylinder and to which the accessory can be connected so that when installed, the accessory can be pivoted relative to the engine from the cylinder, an opposite flat side of the plate being fixed to the engine. A bend is formed intermediate the cylinder and opposite flat side to provide that the cylinder is offset away from the engine with the lower bracket mounted thereto. By this, the lower bracket is more simply and economically produced and it can be made smaller than heretofore.

In accordance with these and other objects of the invention, there is provided an accessory mounting for an engine comprising an elongated first bracket and a second bracket. The second bracket is fixedly attachable to a surface of the engine, a side of an engine accessory being pivotably attachable to said second bracket. An end of said first bracket is fixable to an opposite side of said accessory, and an opposite end portion of said first bracket is captively slidably movably connected to an engine part at a location distal the engine surface to which the second bracket is attachable. Sliding movement of said first bracket is effective to pivot the accessory at said second bracket toward and away from the engine and correspondingly alter a tension in an accessory drive belt connected to said accessory and a belt drive member on the engine.

According to a feature of the invention, there is further provided an accessory mounting for an engine comprising a first bracket, the first bracket having an elongated slot in a first end portion thereof. A second bracket is provided and is fixedly attachable to a surface of the engine, a side of an engine accessory being pivotably attachable to said second bracket. A second end of the first bracket is attachable to one of an opposite side of the engine accessory and an engine part at a location distal the engine surface to which the second bracket is attachable. The opposite end portion of the first bracket elongated slot is captively slidably movable relative to a bolt passing through said slot and received in one of a other of said opposite side of said engine accessory and said engine part. Relative sliding movement between said slot and said bolt is effective to pivot the accessory at said second bracket toward and away from the engine and correspondingly alter a tension in an accessory drive belt connected to said accessory and a belt drive member on the engine. The second bracket is a flat plate stock component having one side rolled back from a side edge into a hollow cylinder for receiving a bolt passing through openings disposed in each of opposite accessory flanges positioned exteriorly alongside opposite ends of the hollow cylinder to pivotably attach the accessory to the second bracket. An axis of the cylinder defines an accessory pivot axis when the second bracket is attached to the engine surface. A second side of the plate stock component opposite said one side has a flat configuration with openings passing therethrough for reception of fasteners with which the second bracket can be attached to the engine surface.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The present invention is concerned with engine mounting an accessory such as an alternator to an automobile engine using for such purpose improved forms of upper and lower mounting brackets for supportively connecting the accessory to the engine in manner which greatly simplifies making drive belt adjustments as well as reducing the complexity of installation of accessories heretofore known.

The engine mounting for an accessory of an engine is equipped with a lower bracket which supports as an axis the lower part of an accessory to the side of an engine, and an upper bracket which moves the upper part of the accessory in an arcuate pivoting movement. The upper bracket is secured to the accessory through an opening in the bracket. The upper bracket can be tightened at a determined position to the side of the engine through an elongated slot formed in the upper bracket.

With the mounting, for doing work after the engine is set up, upper and lower brackets can be attached in reverse so that an empty space for working can be prepared under the engine.

The elongated slot is formed on a flat, sheet-shaped upper bracket. The upper bracket is in contact with a flange surface of the accessory as well as with an attachment surface on the engine side. The upper bracket is securely tightened. Either the front surface or the back surface of the upper bracket can be in contact with the flange surface and the attachment surface on the engine side. It is securely tightened with a bolt.

The attachment surface on the engine side is placed on a bearing case which is attached to a water pump provided with the engine, the bearing case having a spacer function. The height surface of the upper bracket can be adjusted at the time of securing. By having the upper bracket secured to both the bearing case and the cylinder block, the mounting is strengthened, and leaning of the accessory and the upper bracket is controlled, misalignment of the belt being prevented as well.

The upper bracket is of long linear-shape or arc-shape and the slot is formed along this outer shape. The upper bracket projects to the engine side and a rounded tip end of the upper bracket at the engine side can be used to receive a rod-shaped tool for pushing when drive belt tensioning is being effected. The rod-shaped tool can use a convex catching area formed on the edge of a chain cover as a support point for pivoting the rod-shaped tool the upper bracket tip end, the upper bracket being moved in opposition to the tension of the accessory driving belt. By securing the upper bracket and the engine side with a bolt, an ideal belt tension can be achieved.

Figure 1:
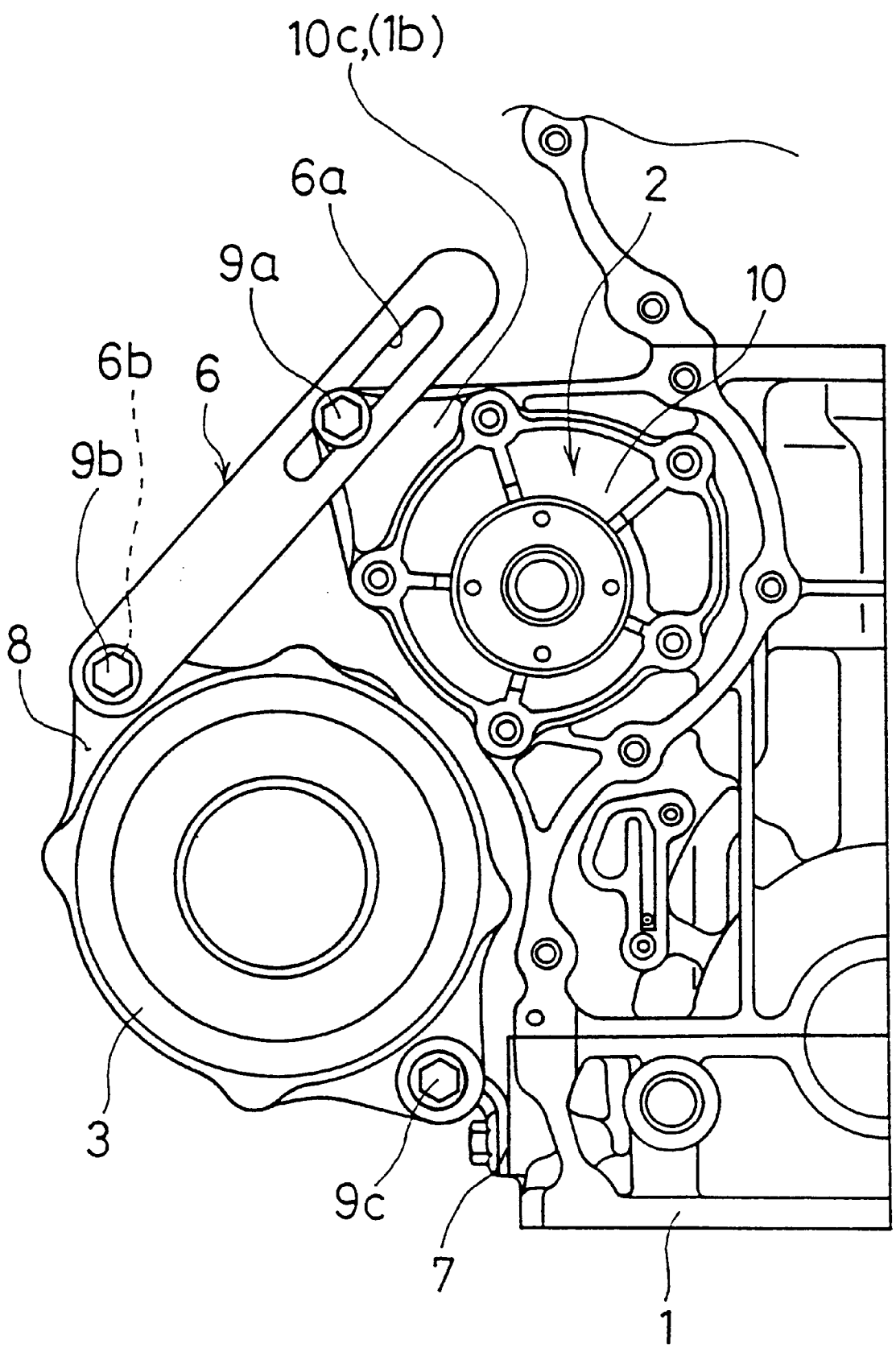
FIG. 1 is a front view of an engine mounting for an engine accessory in accordance with the invention and embodying an upper mounting bracket that is movable on the engine when adjusting a position of the accessory relative to the engine.
Figure 2:
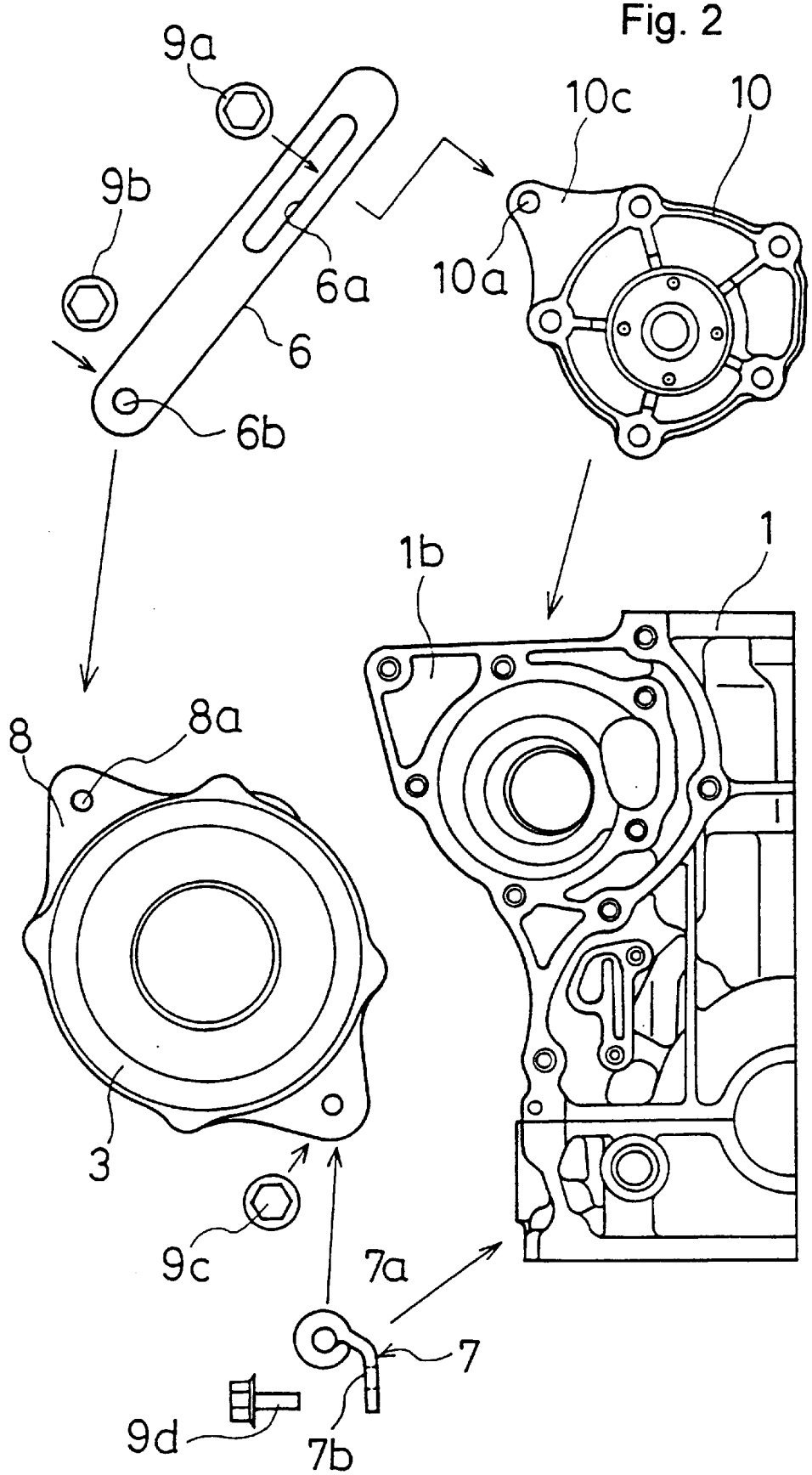
FIG. 2 is an exploded view of the components employed in the FIG. 1 accessory mounting.
Figure 3:
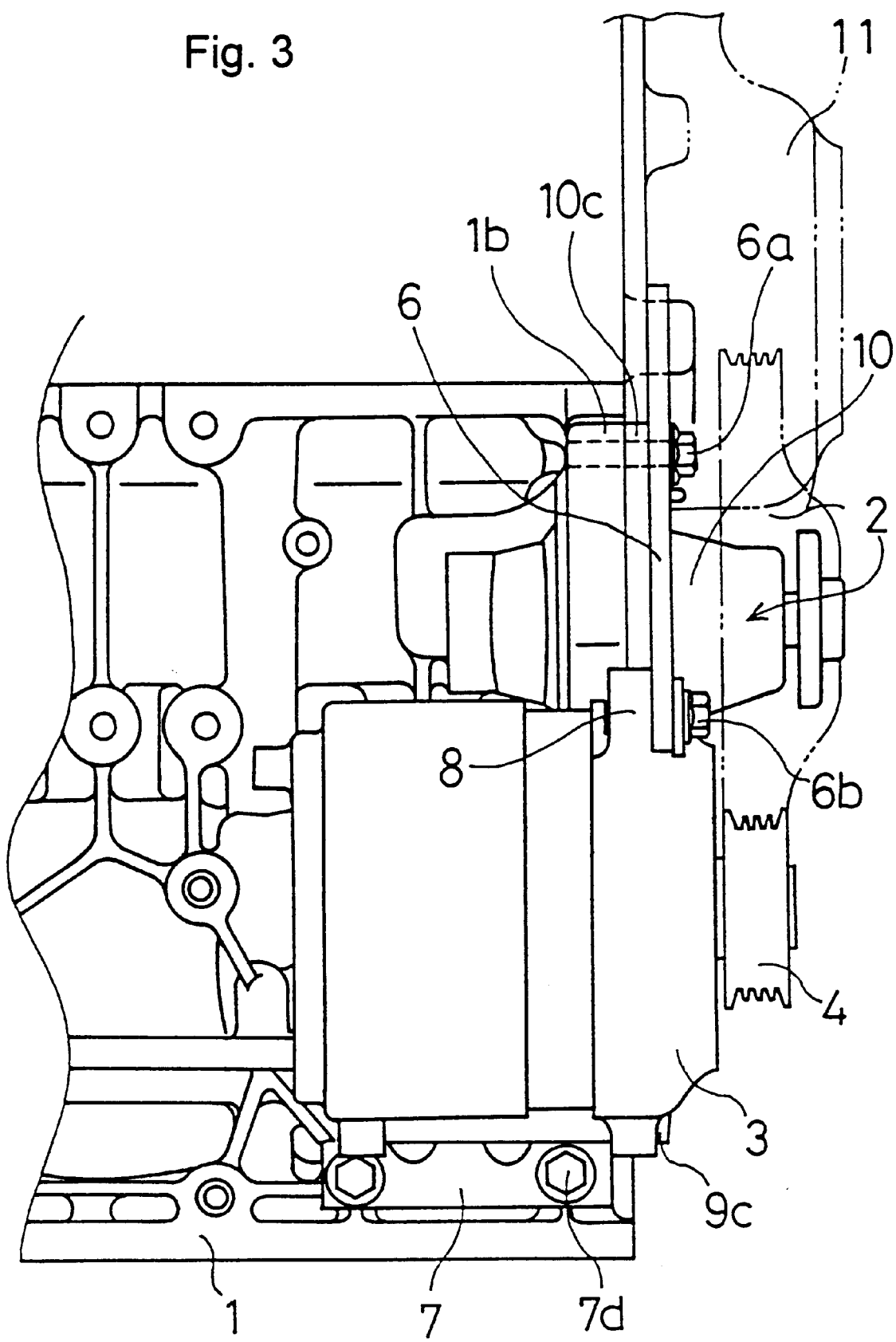
FIG. 3 is a side view of the accessory mounting shown in FIG. 1.

Referring to FIGS. 1 through 3, one part of a whirlpool chamber of water pump 2 is integrated with cylinder block 1. Part of the whirlpool chamber projects and forms a joining surface 1b, and female screw threaded openings of the bearing case of water pump 2 line up with the female screw threaded openings formed on joining area 1b, these being in ring array. Joining surface 10c is formed along the edge of bearing case 10, and a female screw thread is formed therein. The screws for securing water pump 2 are placed in a ring.

Referring to FIG. 2, upper bracket 6 of accessory 3 has an outer shape of a long linear sheet (here, a hot roll steel plate of uniform thickness of 4–10 mm is used). Opening 6b at one end and slot 6a are formed on bracket 6. Opening 6b is placed on the side of the accessory, and slot 6a is placed on the engine side. Lower bracket 7 has a hole 7b for securing the bracket on the engine side by a bolt 9d. Lower bracket 7 also has an axis hole 7a which allows accessory 3 to freely move in a circular motion. A bolt 9c passes through axis hole 7a and secures the lower part of accessory 3.

By having the joining surface 1b of cylinder block 1 and the joining surface 10c of bearing case 10 in contact with each other, the outer surface of joining surface 10c of bearing case 10 is in the same plane as the outer surface of upper flange surface 8 of accessory 3. Bearing case 10 acts as a spacer for cylinder block 1.

Upper bracket 6 is secured to accessory 3 via hole 6b and is also secured to bearing case 10 and cylinder block 1 via slot 6a.

Figure 5:
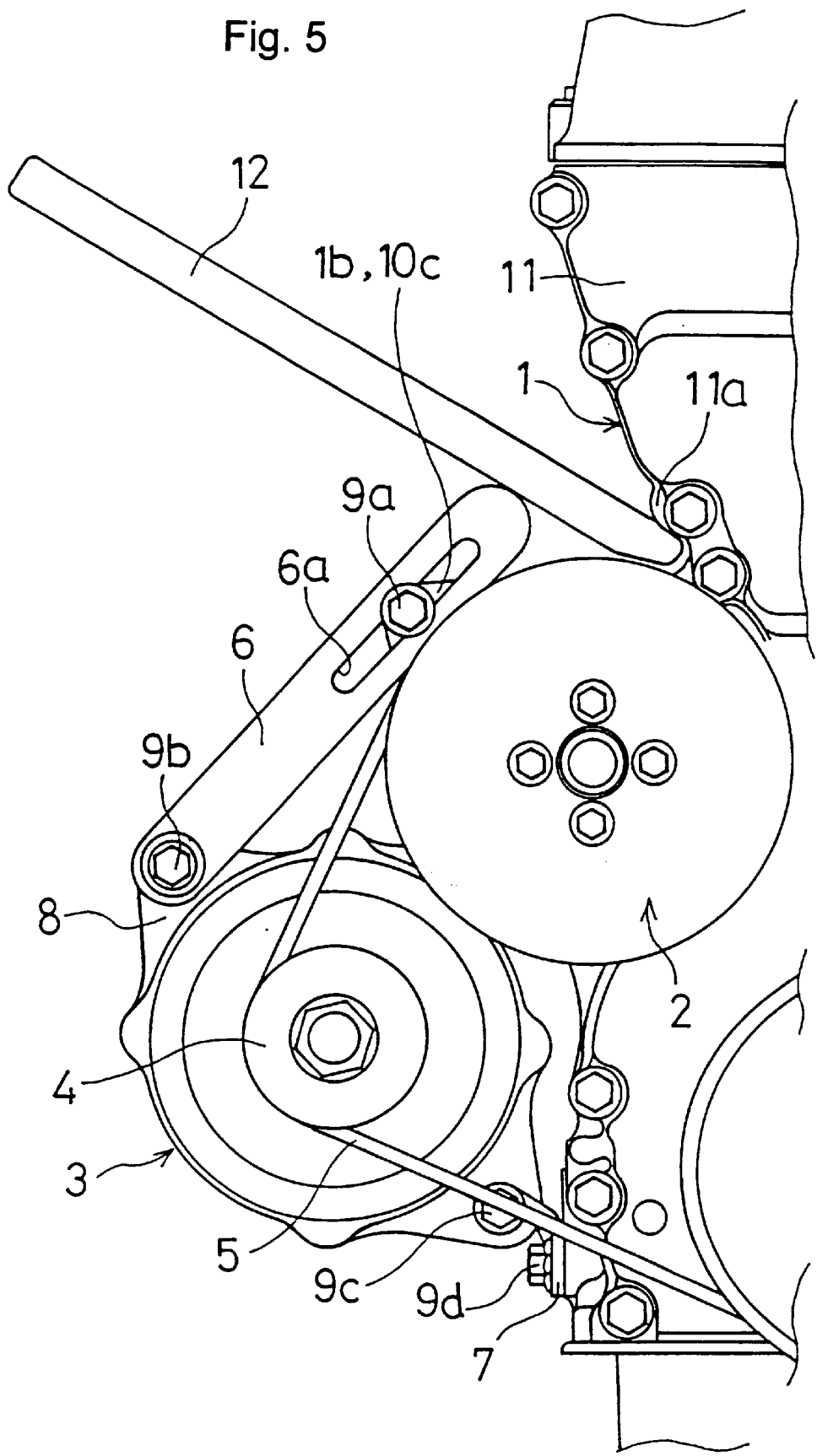
FIG. 5 is a front view depicting an assembly procedure for the accessory mounting shown in FIG. 1.
Figure 6:
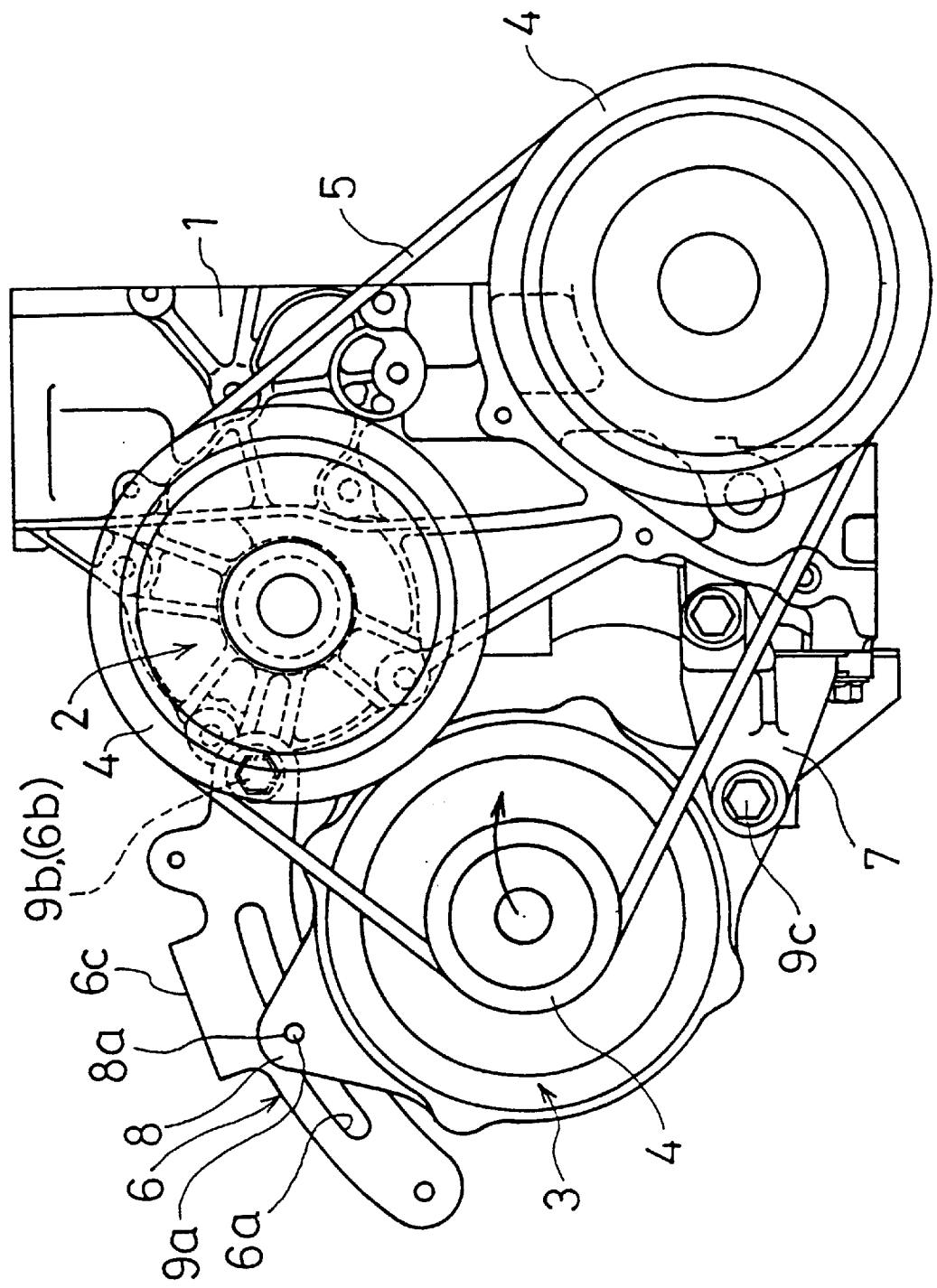
FIG. 6 is a front view of a prior art engine mounting for an alternator and depicting additional engine driven components located proximal the mounting.
Figure 7:
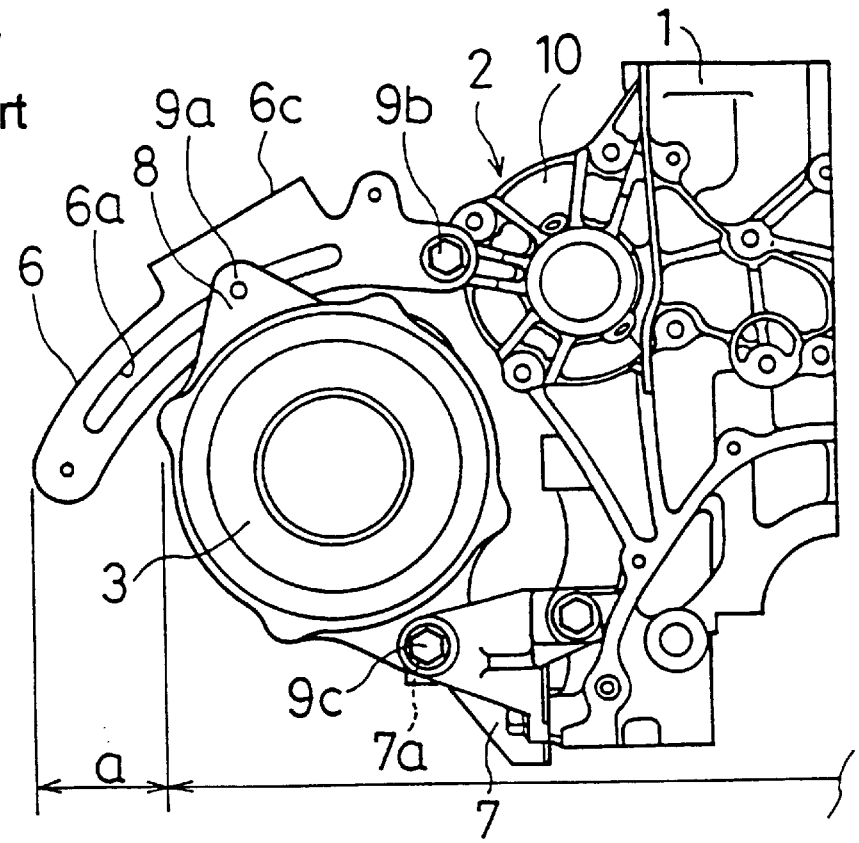
FIG. 7 is a front view of the FIG. 6 accessory mounting parts certain of the additional engine driven components not being shown.
Figure 8:
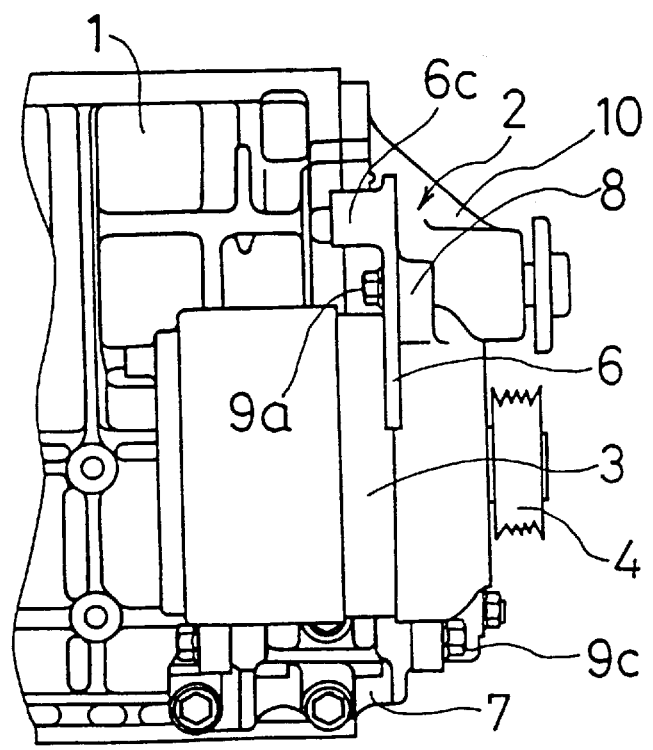
FIG. 8 is a side view of the FIG. 7 accessory mounting.
Figure 9:
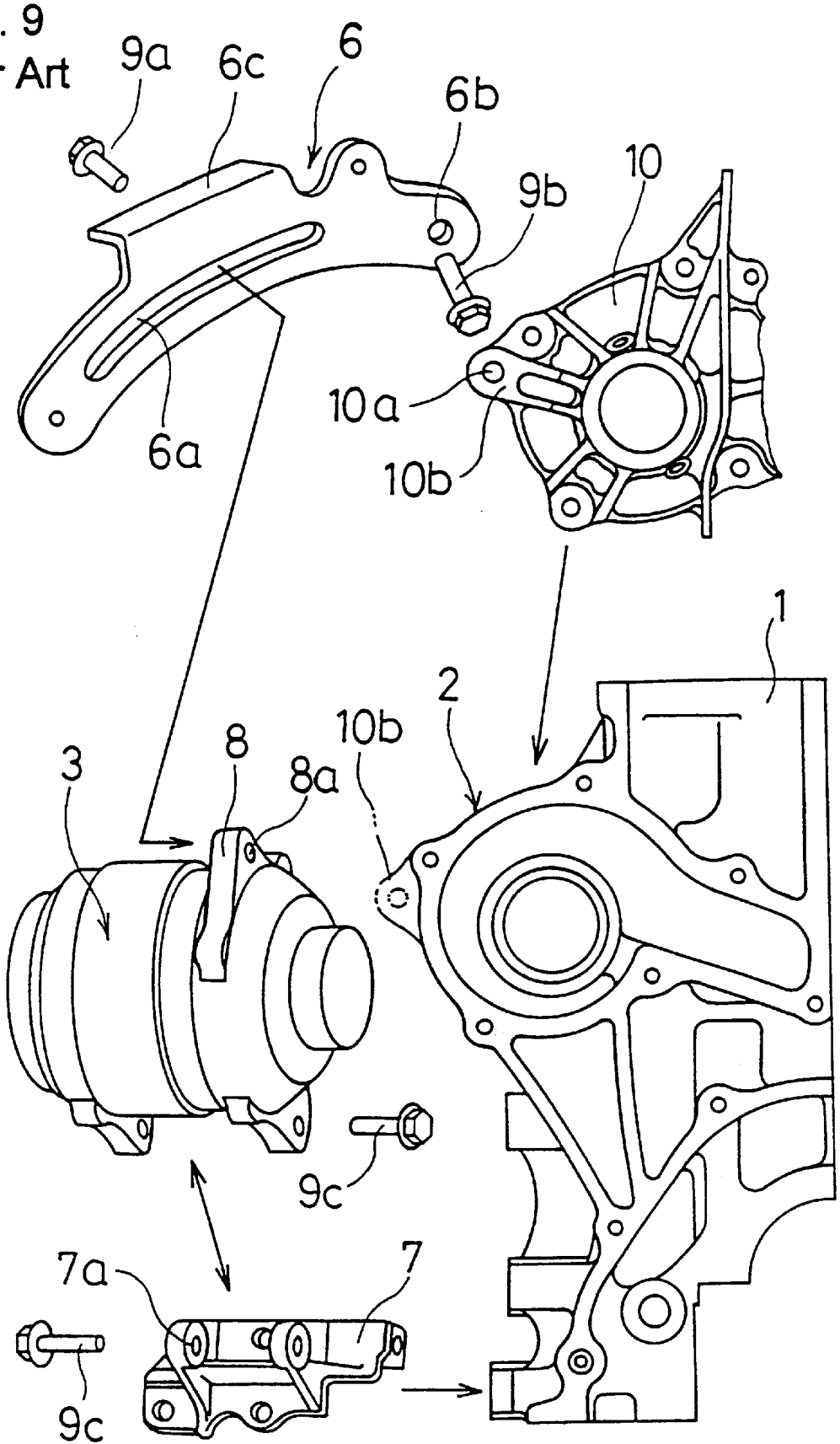
FIG. 9 is an exploded view showing of the FIG. 7 accessory mounting.
Figure 10:
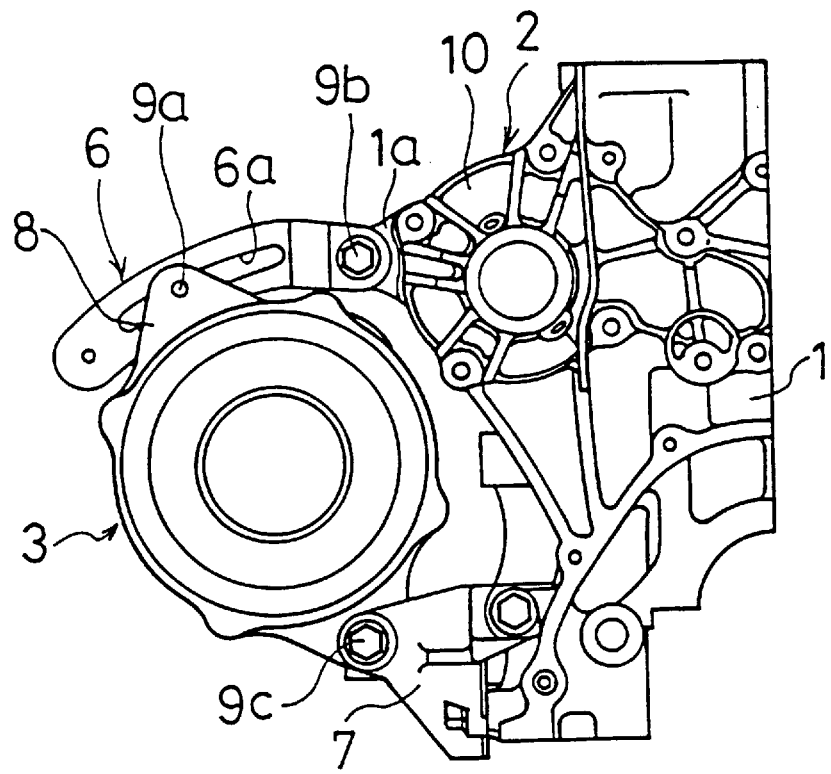
FIG. 10 is a front view of an another form of prior art accessory mounting.
Figure 11:
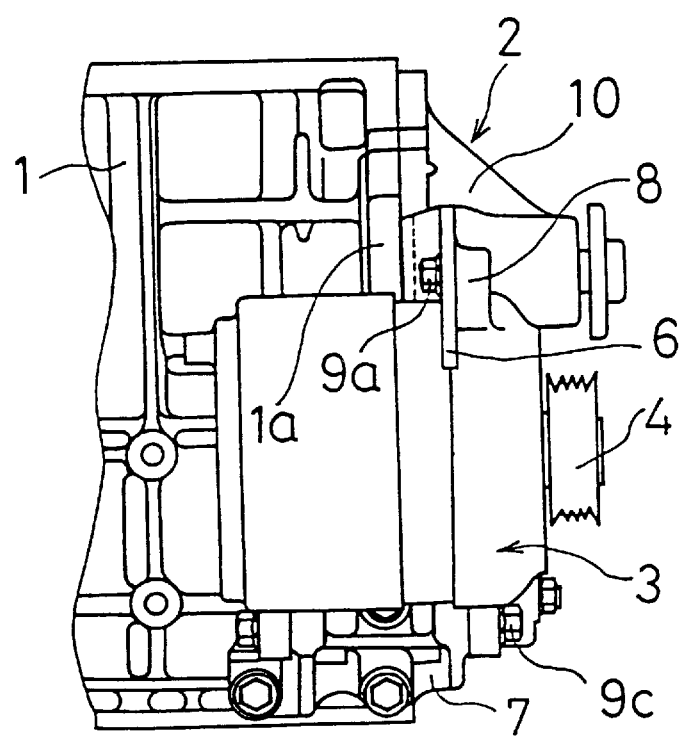
FIG. 11 is a side view of the FIG. 10 accessory mounting.
Figure 12:
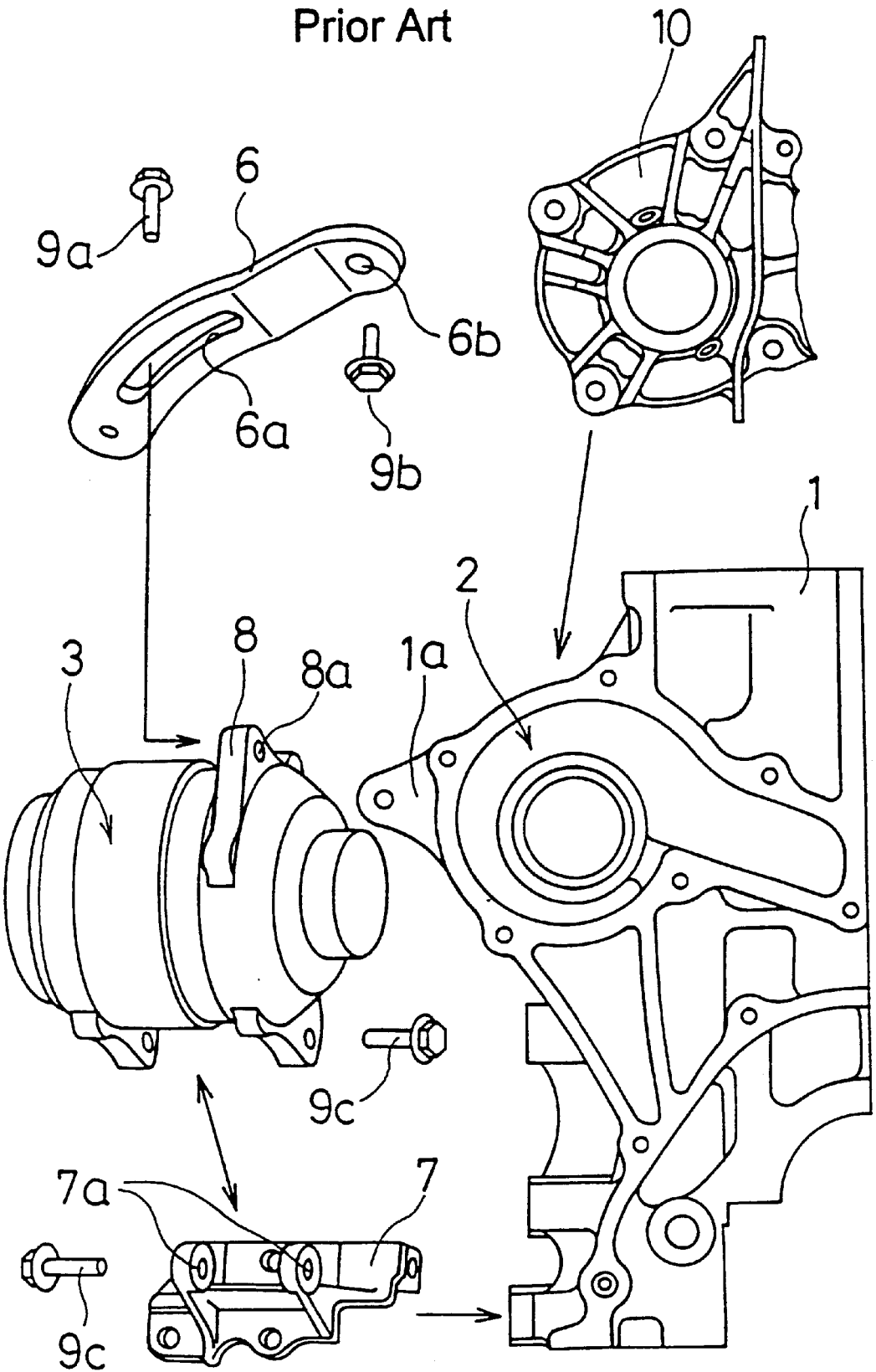
FIG. 12 is an exploded view showing of the FIG. 10 accessory mounting.

Referring to FIG. 5, in the above tightening procedure, assembly is made easier by having a convex catching area 11a which is placed lower than the upper end of upper bracket 6 and which is placed at the edge of chain cover 11 which is attached to the engine. Convex catching area 11a becomes a support point for a rod-shaped tool 12. Convex catching area 11a can be placed not only on chain cover 11, but can also be placed only on cylinder block 1, or on both. Convex catching area 11a can be improved and made stronger by utilizing the thickened areas of a bolt boss or the like. The procedure steps are: three bolts 9a, 9b, 9c are loosened; the end of rod-shaped tool 12 is put up against convex catching area 11a; the middle area of rod-shaped tool 12 is in contact with a tip end of upper bracket 6 and is pushed. As a result, accessory 3 which is supported through hole 6b of upper bracket 6 is moved against the tension of driving belt 5. Accessory 3 is stopped at the position where the tension is ideal. Bolt 9a in slot 6a is securely tightened. Next, the other two bolts 9b, 9b are securely tightened. The tightening procedure is done by operating upper bracket 6 which is small compared to prior practice of moving accessory 3. As a result, productivity is improved, and the adjustment of the tension of the belt becomes easy.

Furthermore, because driving belt 5 can be stretched easily from above the engine, driving belt 5 can be easily adjusted even after the engine is placed in the automobile body, and as a result, serviceability is increased.

Referring to FIG. 1, the place where upper bracket 6, bearing case 10 and cylinder block 1 are secured together is where cylinder block 1, joining surfaces 1b, 10c of bearing case 10 are all tightened together. As a result, it is a stable and strong configuration. The lowering of surface pressure of the contact surface of bearing case 10 can be prevented, and the creation of water leaks prevented. Also, deformation in this area is reduced, and this results in reduction of misalignment of driving belt 5. Because the end with the slot on upper bracket 6 is towards the engine side, upper bracket 6 does not stick out with respect to the width of the engine, and the overall width of the engine in the vehicle engine compartment can be reduced.

Also, by reducing misalignment of driving belt 5, vibration and noise can be reduced. Because upper bracket 6 is of simple form, there is a measurable reduction in overall mounting cost.

Figure 4:
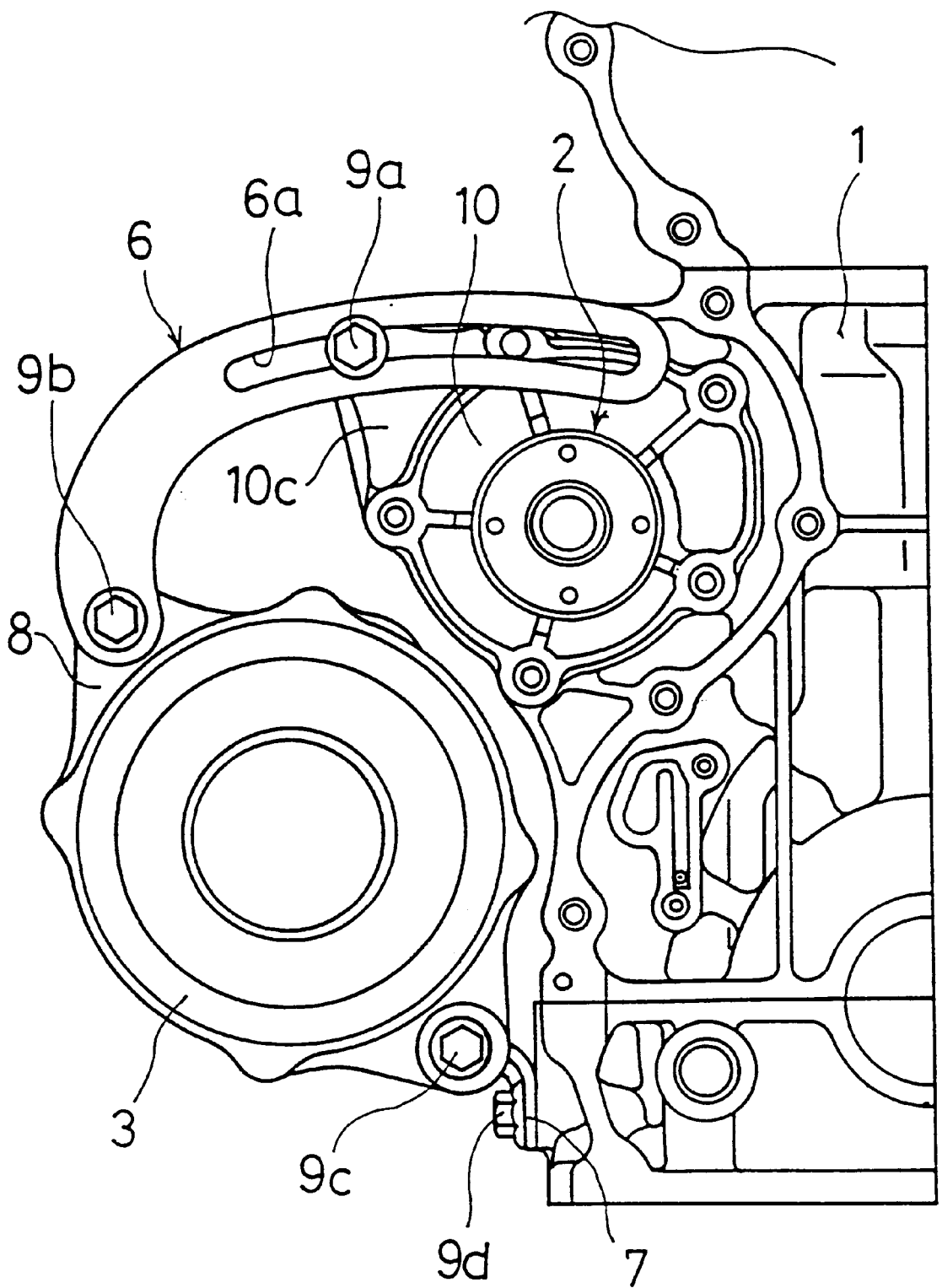
FIG. 4 is a front view showing a modified form of upper mounting bracket.

Referring to FIG. 4, upper bracket 6 can be of curved line shape. In this configuration, slot 6a is an arc-shape. The center of this arc is the position of hole 7a on lower bracket 7 which supports accessory 3. With this configuration, when the tension of driving belt 5 is adjusted, bolt 9c in hole 7a on lower bracket 7 and bolt 9a of slot 6a on upper bracket 6 are loosened. Adjustment can take place without need to loosen bolt 9b which secures accessory 3 to upper bracket 6.

With this, the bracket (upper bracket) which is used for adjusting the tension on the driving belt which links the accessory is on the inner side of the accessory with respect to the engine and overall engine width can be reduced.

Because a sheet-shaped bracket is placed along the attachment surface, deformation and movement of the accessory due to the tension of the accessory driving belt is reduced. Misalignment of the belt is controlled. By controlling the misalignment of the belt, engine vibration and noise are reduced.

When the slot formed in the bracket and the outside shape of the bracket is a linear shape, the member shapes are simplified, and costs are reduced. By making the slot of the arc shape with the center matching the center of circular motion of the accessory, the tension in the accessory driving belt can be adjusted even while the bolt in the hole which secures the accessory and bracket is still tightened. Because tension adjustment is done by moving the bracket without directly pushing on the accessory, the belt can be stretched and the accessory tightened without damaging the accessory or other parts.

The engine mounting includes a lower bracket which axially supports the lower part of the accessory from the side of an engine and an upper bracket which moves the upper part of the accessory in an arc. Because the upper part of the accessory moves in an arc with the lower part as the center, the accessory moves closer and farther from the engine. By this, the tension of the accessory driving belt is adjusted. The accessory is securely tightened in the position where the tension is appropriate.

The lower bracket, which axially supports the accessory, is formed by having one end of a flat plate wound to form an approximate cylinder, the lower bracket being formed from a sheet component. The cylinder is inserted between a pair of flanges on the accessory, and the length of the cylinder is adjusted to match the size of the accessory (the size of the space between the flanges). The radius of the cylinder can be adjusted.

Figure 17:
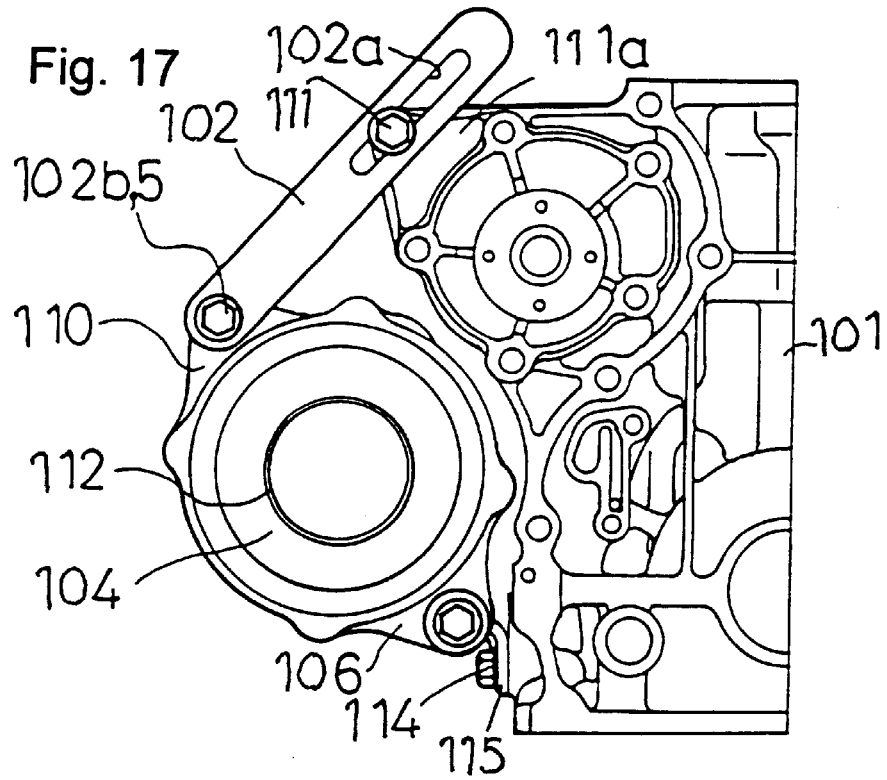
FIG. 17 is a front view showing an embodiment of the mounting of an accessory to an engine using the lower bracket provided by the invention.
Figure 18:
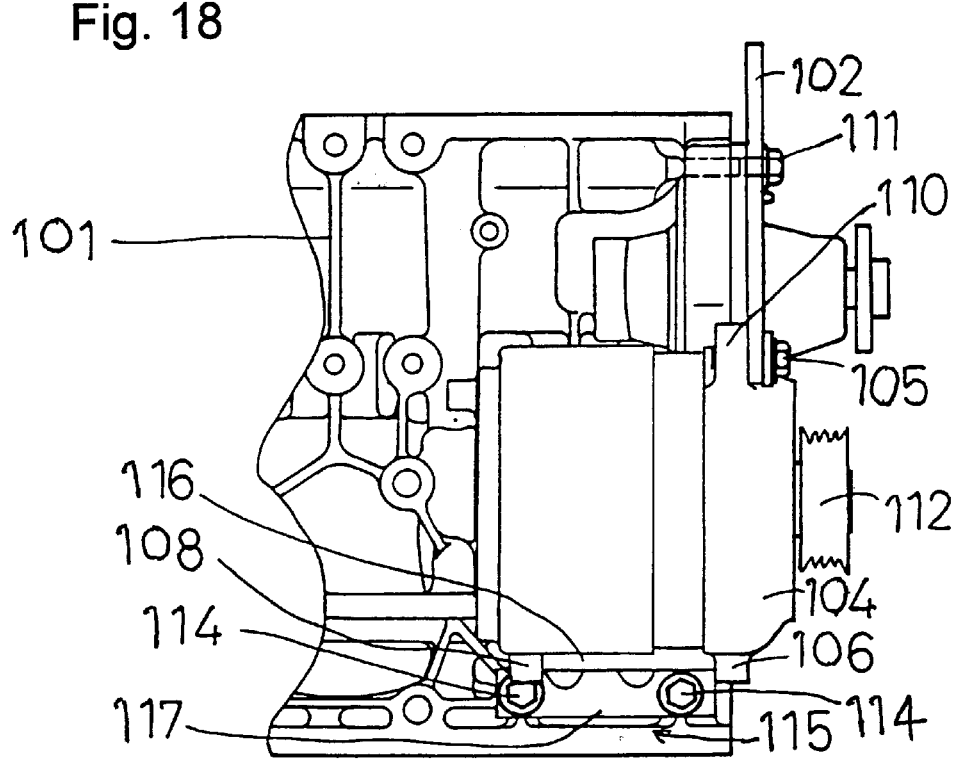
FIG. 18 is a side view of the accessory mounting shown in FIG. 17.
Figure 19:
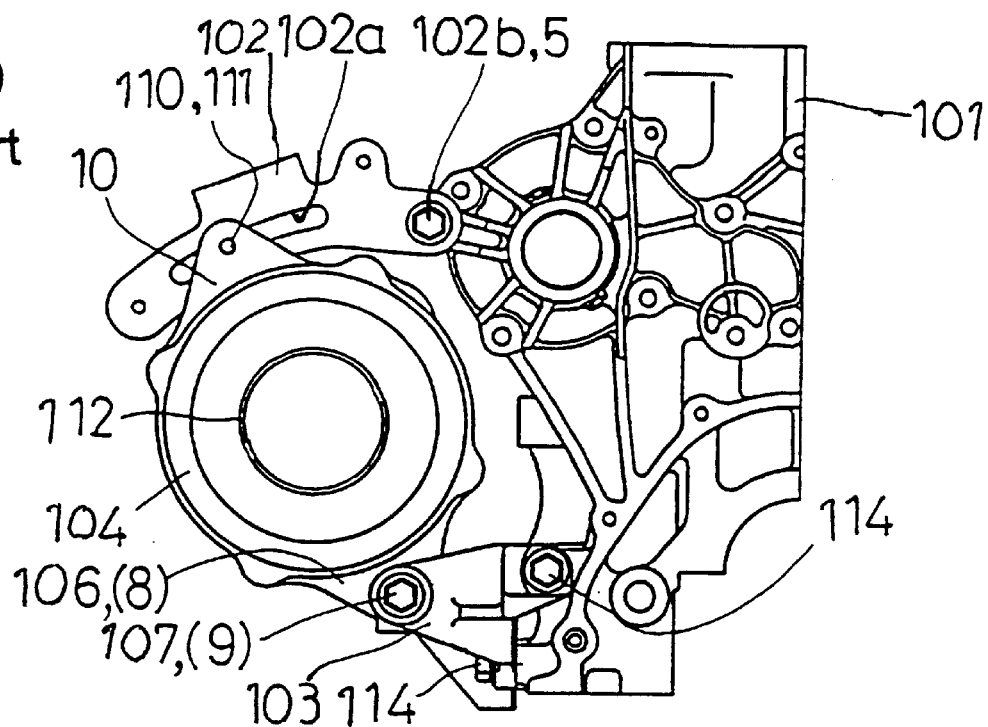
FIG. 19 is front view of a prior art mounting of an accessory illustrating a lower bracket construction as used heretofore.
Figure 20:
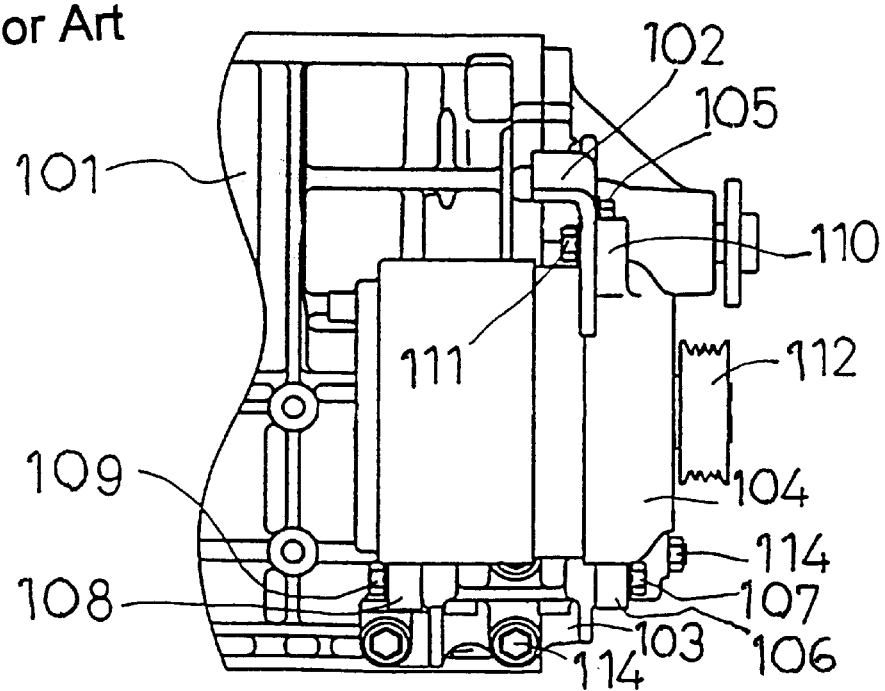
FIG. 20 is a view of the accessory mounting shown in FIG. 19.
Figure 21:
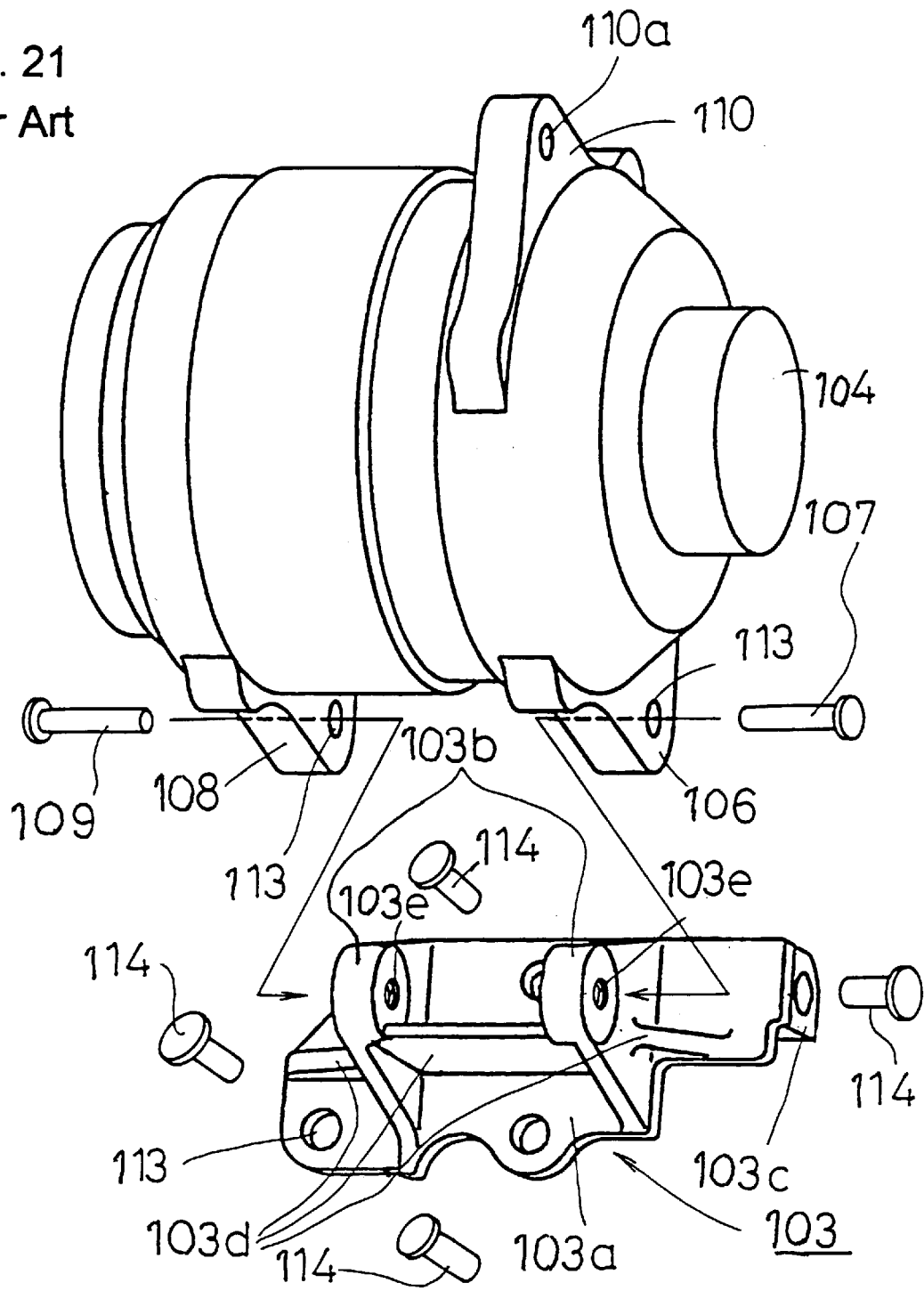
FIG. 21 is an exploded perspective view showing of the accessory and lower bracket parts used in the FIGS. 19 and 20 prior art accessary mounting.

Referring to FIGS. 17 and 18, accessory 104 is positioned to the side of an engine 101. The upper part of accessory 104 is anchored by a long upper bracket 102 which is secured to engine 101. The lower part of accessory 104 is anchored to engine 101 via a lower bracket 115.

An elongated slot 102a and a hole 102b are formed on upper bracket 102. Upper flange 110 of accessory 104 is securely tightened to upper bracket 102 by a bolt 105 which passes through hole 102b. A bolt 111 which passes through slot 102a is securely tightened to a tip 101a of a water pump fixed on engine 101. By the position of the securing bolt 111 and slot 102a, the position of upper bracket 102 changes, and the tension of accessory driving belt can be adjusted.

Figure 13:
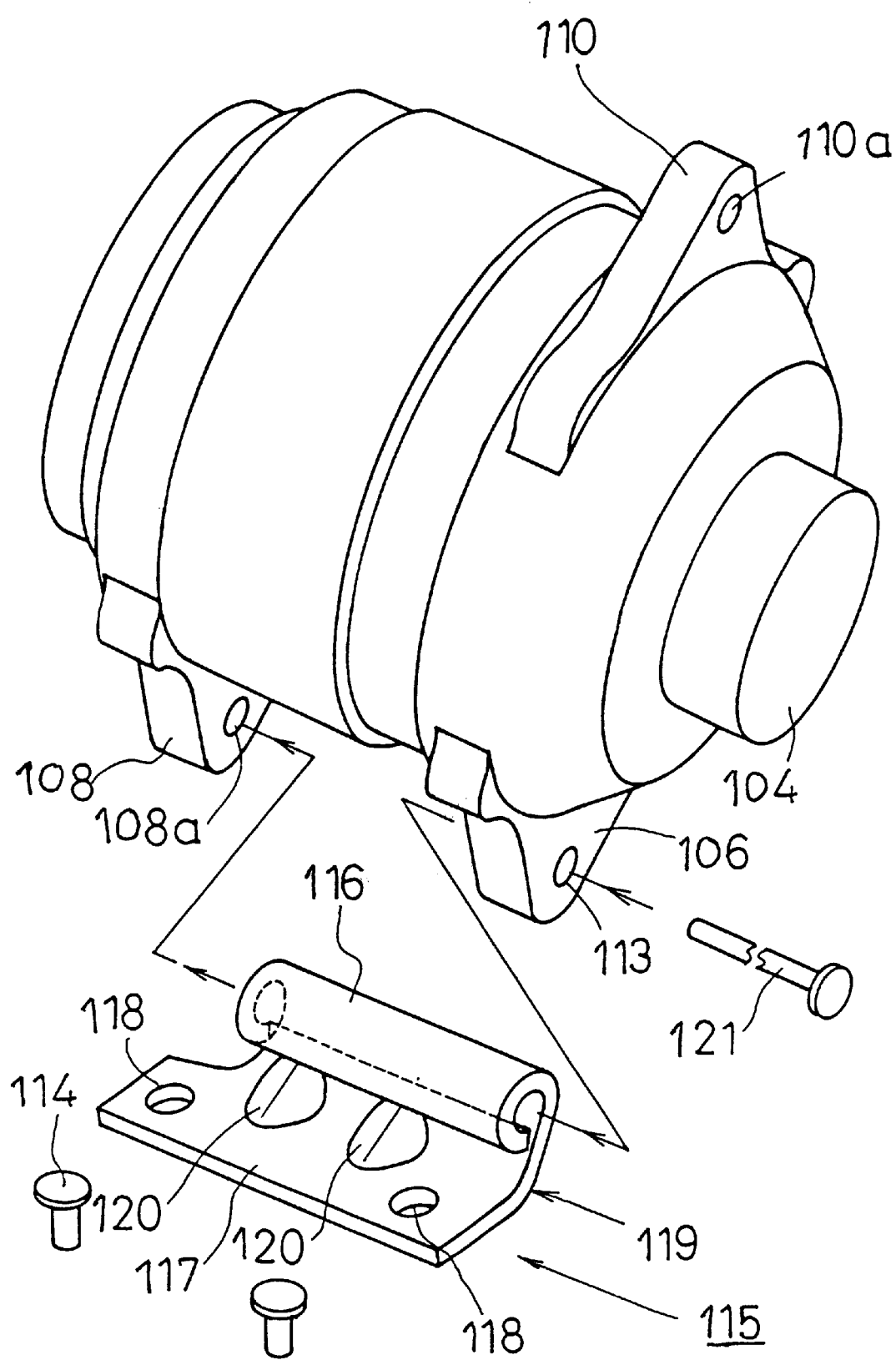
FIG. 13 is an exploded perspective view of an engine accessory and a lower bracket for securing the accessory to an engine structure which lower bracket is constructed in accordance with the present invention.

Referring to FIG. 13, accessory 104 is equipped with an upper flange 110 and a pair of lower flanges 106, 108. Lower flanges 106, 108 are formed so that they intersect with the axis of circular movement of accessory 104. An attachment hole 113 is formed on flange 106 which is in front. A female screw thread 108a is formed on flange 108.

Figure 16:
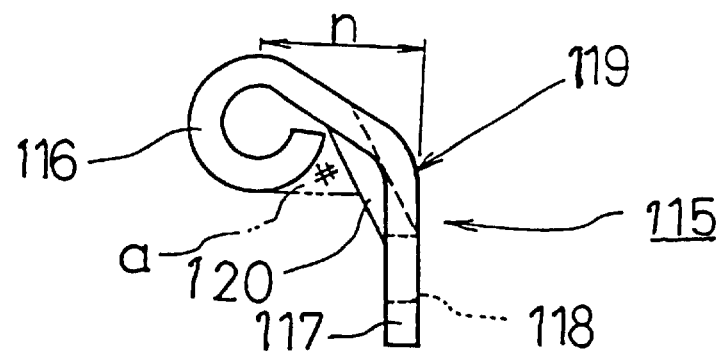
FIG. 16 is a front view of the lower bracket.

Referring to FIGS. 13 and 16, part of the plate component forming lower bracket 115 is bent into a cylinder to form cylinder 116. An attachment hole 118 for engine 101 is formed on a flat area 117. A bent area 119 is formed between cylindrical area 116 and flat area 117. The center of cylindrical area 116 is separated from flat area 117 by a bent center part bent 119 by spacing n.

Beads or reinforcing ribs 120 are formed on bent area 119 and strengthens bent area 119. By making such a form by casting, a thickened area a (# area of FIG. 16) is created at the end where it is bent to make a cylinder. The weight is increased and the cost can not be reduced, but, for instance, if sheeting (a hot roll steel plate with an uniform thickness of 4–10 mm) is used, no thickened area a is formed, and it can be made inexpensively.

Figure 15:
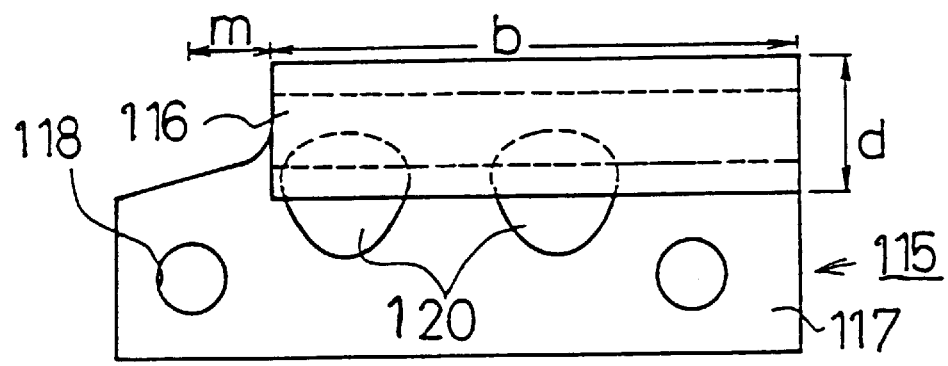
FIG. 15 is a side view of the lower bracket.

Referring to FIGS. 13 and 15, flat area 117 of lower bracket 115 is made longer than cylindrical area 116. In this area, an attachment hole 118 is formed at a distance m outside the edge of cylindrical area 116. The strength is increased with respect to the attachment to engine 101. Depending on the measurement of the attachment to accessory 104, when the length b of cylindrical area 116 becomes larger, diameter d is increased.

Figure 14:
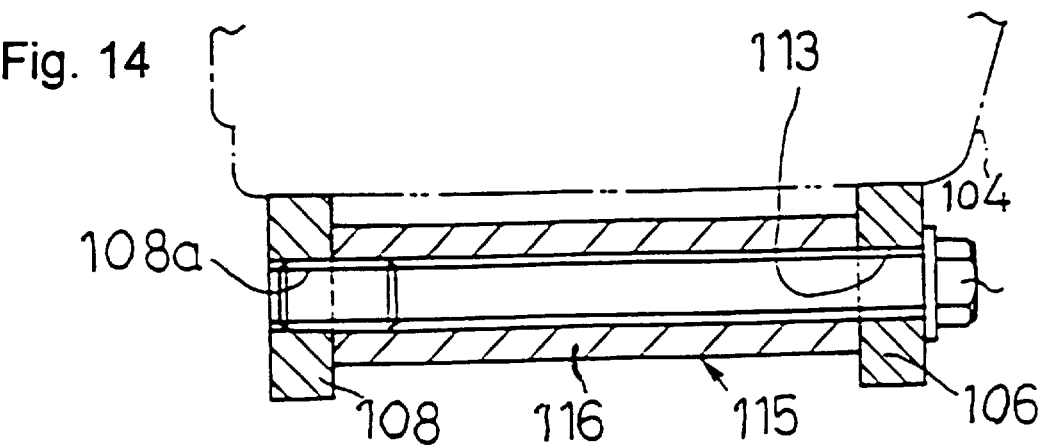
FIG. 14 is a cross-sectional view showing of the lower bracket.

As explained above, accessory 104 is attached to engine 101 by lower bracket 115. When lower bracket 115 is secured to engine 101, cylindrical area 116 is positioned offset from the attachment plane, i.e., from the engine surface. Referring to FIGS. 13 and 14, the pair of lower flanges 106, 108 of accessory 104 are placed so that they sandwich cylindrical area 116. A bolt 121 is passed from the front of the engine and is securely tightened.

As a result, accessory 104 and lower bracket 115 is secured by a single bolt 121. Furthermore, since lower bracket 115 is small, the attachment to the side of engine 101 is only secured by 2 bolts 114, the number of parts is reduced. This improves the assembly operation.

Lower bracket 115 is not welded or cut and can be formed as a single piece member from the sheet component. Processing steps such as opening holes and the like are reduced, and the decrease in cost is significant. Vibration reduction can be anticipated due to the differing materials at the contact surface between engine 101 of aluminum alloy and the steel plate used in lower bracket 115.

Furthermore, lower bracket 115 can be mixed with the small parts which are also made from the same steel, and the unused parts can be recycled further reducing cost. By forming the cylinder 116, strength is assured, and the miniaturization and lightening of lower bracket 115 is achieved.

In the present invention as constructed above, the bracket defines the axis by which the accessory can freely move in a circular motion with respect to the engine.

Having described preferred embodiments of the invention with reference to the accompanying drawings, it is to be understood that the invention is not limited to those precise embodiments, and that various changes and modifications may be effected therein by one skilled in the art without departing from the scope of spirit of the invention as defined in the appended claims.

What is claimed is:

1. A mounting for mounting an accessory to an engine, said mounting comprising the combination with an accessory and an engine, a first bracket, the first bracket having an elongated slot in a first end portion thereof, and a second bracket, the second bracket being fixedly attachable to a surface of the engine, a side of an engine accessory being pivotably attachable to said second bracket, a second side of the first bracket being attachable to one of an opposite side of the engine accessory and an engine part at a location distal the engine surface to which the second bracket is attachable, the opposite end portion of the first bracket elongated slot being captively slidably movable relative to a bolt passing through said slot and received in one of a other of said opposite side of said engine accessory and said engine part, a relative sliding movement between said slot and said bolt being effective to pivot the accessory at said second bracket toward and away from the engine and correspondingly alter a tension in an accessory drive belt connected to said accessory and a drive belt member on the engine, said second bracket being a plate stock component having one side part rolled back from a side edge into a hollow cylinder for receiving a bolt passing through openings disposed in each of opposite accessory flanges positioned exteriorly alongside opposite ends of the hollow cylinder to pivotably attach the accessory to the second bracket, an axis of the cylinder defining an accessory pivot axis when the second bracket is attached to the engine surface, a second side part of the plate stock component opposite said one side having a flat configuration with openings passing therethrough for reception of fasteners with which the second bracket can be attached to the engine surface, a center part of the plate stock component being bent with respect to the second side thereof whereby with the second bracket attached to the engine surface, the hollow cylinder is offset a distance outwardly of the engine, at least parts of the plate component center part having reinforcing ribs thereon, said reinforcing ribs extending between said one side part and said second side part to provide a strengthening of said center part.

2. Accessory mounting in accordance with claim 1 in which the second side part of the plate component is of greater longitudinal length than the first side part.

* * * * *